United States Patent [19]
Andrea

[11] Patent Number: 6,108,415
[45] Date of Patent: Aug. 22, 2000

[54] NOISE CANCELLING ACOUSTICAL IMPROVEMENT TO A COMMUNICATIONS DEVICE

[75] Inventor: Douglas Andrea, Old Brookville, N.Y.

[73] Assignee: Andrea Electronics Corporation, Helville, N.Y.

[21] Appl. No.: 08/953,021

[22] Filed: Oct. 17, 1997

Related U.S. Application Data

[60] Provisional application No. 60/028,950, Oct. 17, 1996.

[51] Int. Cl.[7] .................................................. H04M 1/19
[52] U.S. Cl. .......................................... 379/433; 381/357
[58] Field of Search .................................. 379/387, 419, 379/428, 433; 455/570, 90; 381/157, 158, 159, 169, 181, 304, 305, 344, 355, 356, 357, 359

[56] References Cited

U.S. PATENT DOCUMENTS

| | | |
|---|---|---|
| 4,584,702 | 4/1986 | Walker, Jr. . |
| 5,148,471 | 9/1992 | Metroka et al. . |
| 5,539,834 | 7/1996 | Bartlett et al. . |
| 5,627,901 | 5/1997 | Josephson et al. . |
| 5,682,418 | 10/1997 | Ide ...................................... 379/433 X |
| 5,890,072 | 3/1999 | Rabe ................................... 379/433 X |
| 5,937,361 | 8/1999 | Smith ....................................... 455/575 |

*Primary Examiner*—Scott L. Weaver
*Attorney, Agent, or Firm*—Frommer Lawrence & Haug LLP; Thomas J. Kowalski

[57] ABSTRACT

A cellular telephone for reducing background noise comprising a housing having a receiver portion and a speaker portion; the receiver portion having a voice port and a noise port; a microphone isolator located within the receiver portion; at least one noise canceling microphone having a front end and a back end enclosed by the microphone isolator; an windscreen placed in front of the microphone and internally behind the voice port; and an acoustical port to permit a pressure gradient noise porting placed at the back end of the microphone and internally behind the noise port.

3 Claims, 6 Drawing Sheets

NOISE CANCELLING ACOUSTICAL IMPROVEMENT TO A COMMUNICATIONS DEVICE

This application claims benefit of Provisional appl. 60/028,950 filed Oct. 17, 1996.

FIELD OF THE INVENTION

This invention relates to a noise canceling wireless, e.g., cellular telephones and, more particularly, to a pressure gradient microphone located within a microphone isolator of a cellular phone for canceling or reducing background acoustic noise so that speech intelligibility is enhanced.

DESCRIPTION OF THE PRIOR ART

As is to be appreciated, in numerous situations, the presence of background acoustic noise is undesirable in voice transmissions. As an example, consider the situation in which a cellular phone user is attempting to conduct a telephone conversation in a noisy environment. In this situation, loud acoustic background noise is received by a microphone in the cellular phone and converted to an electrical signal which is supplied to the telephone(s) of the person(s) having the conversation with the user and is converted thereat to an acoustic signal. This results in distorted sidetones. As a result, the person to whom the user is communicating constantly hears the loud background noise because of these sidetones. Further, when the person is speaking, such speech is combined with the background noise and, as such, may be difficult for the other person(s) to understand. As a result, the user often has to raise his/her voice and literally shout into the microphone of the cellular phone to be heard. Furthermore, the signal representing the background noise is also supplied from the microphone in the cellular phone to the sidetones in a cellular phone or telephone handset or the like. Thus, the sidetones are distorted due to the background noise, which distorts the acoustic signal, and then impairs speech intelligibility.

The conventional cellular phones, such as the Qualcomm QCP-800 cellular phone, do not reduce background noise to improve performance of cellular phones or the like utilized in a noisy environment or the like. Rather, the standard microphones utilized in such conventional phones are omnidirectional microphones. These standard microphones accept background and audio signals and conveys an electrical signal, which is degraded by ambient noise. Furthermore, an omnidirectional microphone accepts signals in all directions, including ambient noise propagating in more than one direction which is transmitted as an input signal to the microphone together with the audio speech.

Thus, the utilization of the omnidirectional microphone in the standard cellular phone does not prevent speech from being distorted in a noisy environment or when utilizing digital means to convey sound signal when using cellular phones. Support that the speech is distort when using omnidirectional microphones in cellular phones is shown in the comparative testing performed by Andrea Electronics Corporation of a conventional cellular phone and a phone of the present invention.

For instance, a standard Qualcomm QCP-800 cellular phone uses a "Personal Communications System" (PCS) that digitally compresses speech into a narrower bandwidth by calibrating the speech through a CODEC algorithm. However, unwanted background noise is also processed with the speech through the CODEC algorithm, which in turns degrades the speech compressed algorithm. As shown by the Articulation Indexes, to be fully discussed below, only 5 correct words out of 100 are recognized by the tested Qualcomm QCP-800 cellular phone.

Furthermore, the Qualcomm QCP-800 cellular phone is used in connection with computer software that samples speech at a narrower bit rate in a narrower bandwidth. It is desirable to cancel noise before it is transmitted to the software sampling to prevent an inaccurate software voice sampling. The current voice sampling, which includes ambient noise, of a Qualcomm QCP-800 cellular phone interferes with the speech transmission leading to a decrease in the speech enhancement or speech intelligibility performance.

Conventional omnidirectional microphones cannot simply be replaced with noise canceling microphones having pressure sensitive surfaces with a low gain to enhance noise canceling without typically having to replace the cellular phone with a new cellular phone. Simple replacement of the type of microphone does not solve the problem. Rather, as will be discussed in the present invention, the mechanical/acoustical arrangement of the microphone within the necessary input ports must take place so that noise cancellation occurs. This is because the mechanical/acoustical arrangement of the noise canceling microphone allows for sound equalization of the noise received from the noise port to achieve performance in the articulation indexes described herein, as such, would be relatively expensive.

Thus, the prior art has failed to provide a relatively low-cost means for reducing background noise to an acceptable level for use with wireless telephones cellular phones or the like by mechanically/acoustically diffraction means, and a cost-effective means for enabling existing wireless telephones that use digital network to reduce background noise to an acceptable level.

OBJECTS AND SUMMARY OF THE INVENTION

An object of the present invention is to provide an acoustical improvement to cellular phones which overcomes the problems associated with the prior art.

Specifically, it is an object of the present invention to provide a noise canceling cellular phone which reduces background noise by mechanical/acoustical means thereby increasing the speech intelligibility for the speaker and listener.

More specifically, it is object of the present invention to provide noise canceling cellular phones as aforementioned which is relatively inexpensive.

It is still an object of the present invention to provide a relatively low-cost noise canceling acoustical improvement to existing cellular phones to enhance speech performance which is operable with standard battery operated power.

Another object of the present invention is to provide a relatively low-cost acoustical improvement to the manufacture of cellular phones or to be readily adaptable to existing cellular phones to provide a functioning noise canceling microphone that equalizes the noise received from the noise port with the noise received from the voice port to convey only the audio signal to the receiver portion or sidetones.

An aspect of this invention is to provide a cellular phone having a noise canceling microphone placed within a microphone isolator, which contains a noise port and voice port, an acoustical baffle placed internally behind the voice port, and a acoustical opening to permit pressure gradient noise porting so that the ambient noise is mechanically canceled from the noise received with the speech received. The cellular phone for reducing background noise comprising: a housing having a receiver portion and a speaker portion; the receiver portion having a voice port and a noise port; a microphone isolator located within the receiver portion; at least one noise canceling microphone having a front end and a back end enclosed by the microphone isolator; a windscreen placed in front of the microphone and internally behind the voice port; and an acoustical port to permit a pressure gradient noise porting placed at the back end of the microphone and internally behind the noise port. The preferred noise canceling microphone is a pressure gradient microphone, but any unidirectional microphone having a low gain will enhance the noise cancellation performance.

Other objects, features and advantages according to the present invention will become apparent from the following detailed description of the illustrated embodiments when read in conjunction with the accompanying drawings in which corresponding components are identified by the same reference numerals.

DETAILED DESCRIPTION

Figure 1:
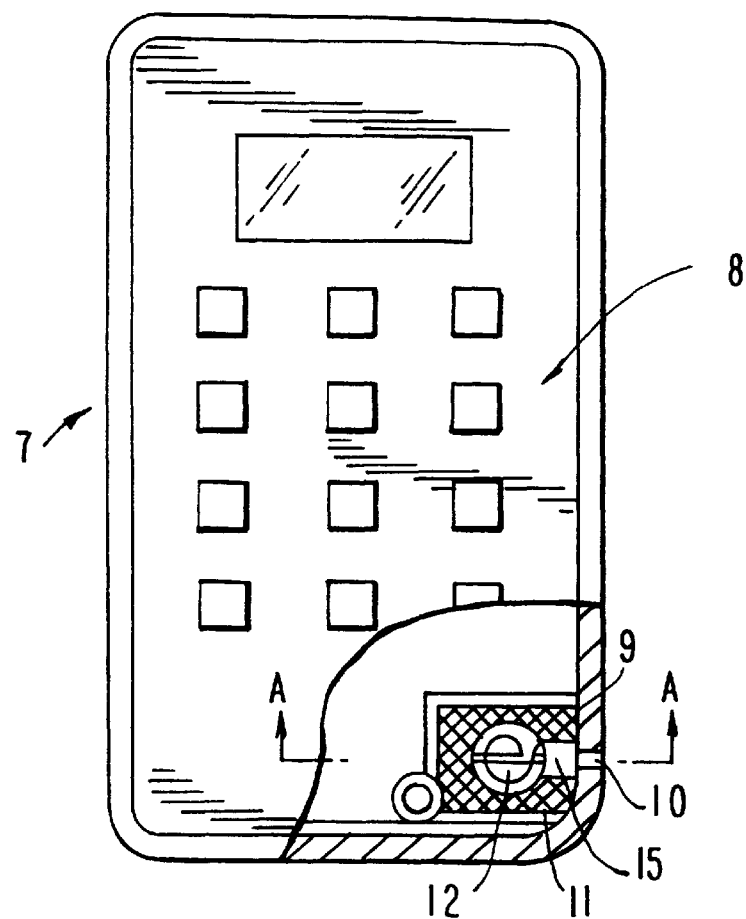
FIG. 1 is a plan view of the wireless telephone with the top being partially removed to reveal a noise canceling acoustical improvement according to the present invention.

FIG. 1 illustrates a wireless telephone or cellular phone 8 utilizing a noise canceling acoustical improvement in accordance with an embodiment of the present invention. As shown therein, the wireless telephone unit or cellular phone 8 having a speaker portion and receiver portion generally includes a microphone isolator 9, a noise port 10, a voice port 13, dense foam 11, acoustical opening 15 that is sized and tuned for a desired frequency response, a windscreen 14, and a noise canceling microphone 12. The cellular phone 8 can be coupled to a telephone unit (not shown) by way of RF waves or can be battery operated. The wireless telephone or cellular phone 8 of the present invention mechanically diffracts the noise received from the noise port 10 with the noise received from the voice port 13 so that the noise is canceled from the speech inputted into the voice port 13 from the user.

In FIG. 1, the microphone isolator 9 is illustrated within the receiver portion of the housing of the cellular phone 8. The isolator 9 can be comprised of rubber, dense foam-like material, or another suitable damping material. This isolator 9 is internally beneath the acoustical port holes or in close proximity to the voice port 13 of the cellular phone 8. The noise canceling microphone 12 of the present invention is preferably a pressure gradient microphone available from Panasonic or Primo. Alternatively, a unidirectional microphone that has a FET with a low gain having low sensitivity to be more effective for active noise cancellation. These low sensitive microphone with low gain that accept near field responses can be utilized in the present invention.

The pressure sensitive microphone 12 has a front end and a back end having pressure sensitive surfaces with holes or openings on each surface. These holes permit sound to enter from the back of this microphone as well as the front of this microphone. The pressure gradient microphone responds to a difference in pressure. Therefore, to have effective noise cancellation with a pressure gradient microphone the sound pressure of the background noise must arrive simultaneously or at approximately the same time with the sound pressure from the background noise and audio signal received from the voice port.

Figure 2:
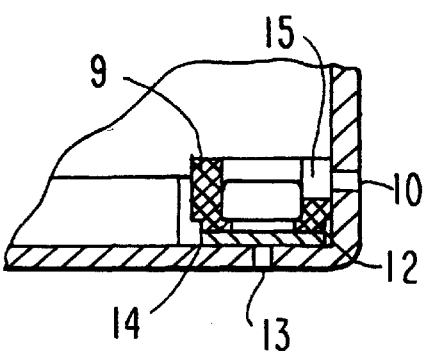
FIG. 2 is a partial side view of the noise canceling improvement of the cellular phone of FIG. 1.

When the pressure sensitive microphone is place in the cellular phone 8 as shown in FIGS. 1 and 2, the microphone isolator and ports must be so arranged so that the noise entering from the back of the microphone from the noise port and the noise and speech entering from the voice port equalize or cancel out the noise portion of the signal.

As stated, the preferred pressure gradient microphone 12 responds to the difference in pressure at two closely spaced ports, the voice port 13 and the noise port 10. When used in an environment where the pressure gradient of the background noise is isotropic, the electrical signal produced by the pressure-gradient microphone due to such background noise is effectively zero. Since the two opposite sides of a pressure-gradient microphone respond to acoustic pressure, as previously mentioned, the microphone isolator 9 is created or modified so as to enable these two sides of the microphone to respond simultaneously with the acoustic pressure.

Therefore, the noise that enters from the noise port reaches the pressure gradient microphone and reaches the noise that enters with the speech from the voice port and by acoustical/mechanical means cancels the background noise and increases speech intelligibility.

Figure 3:
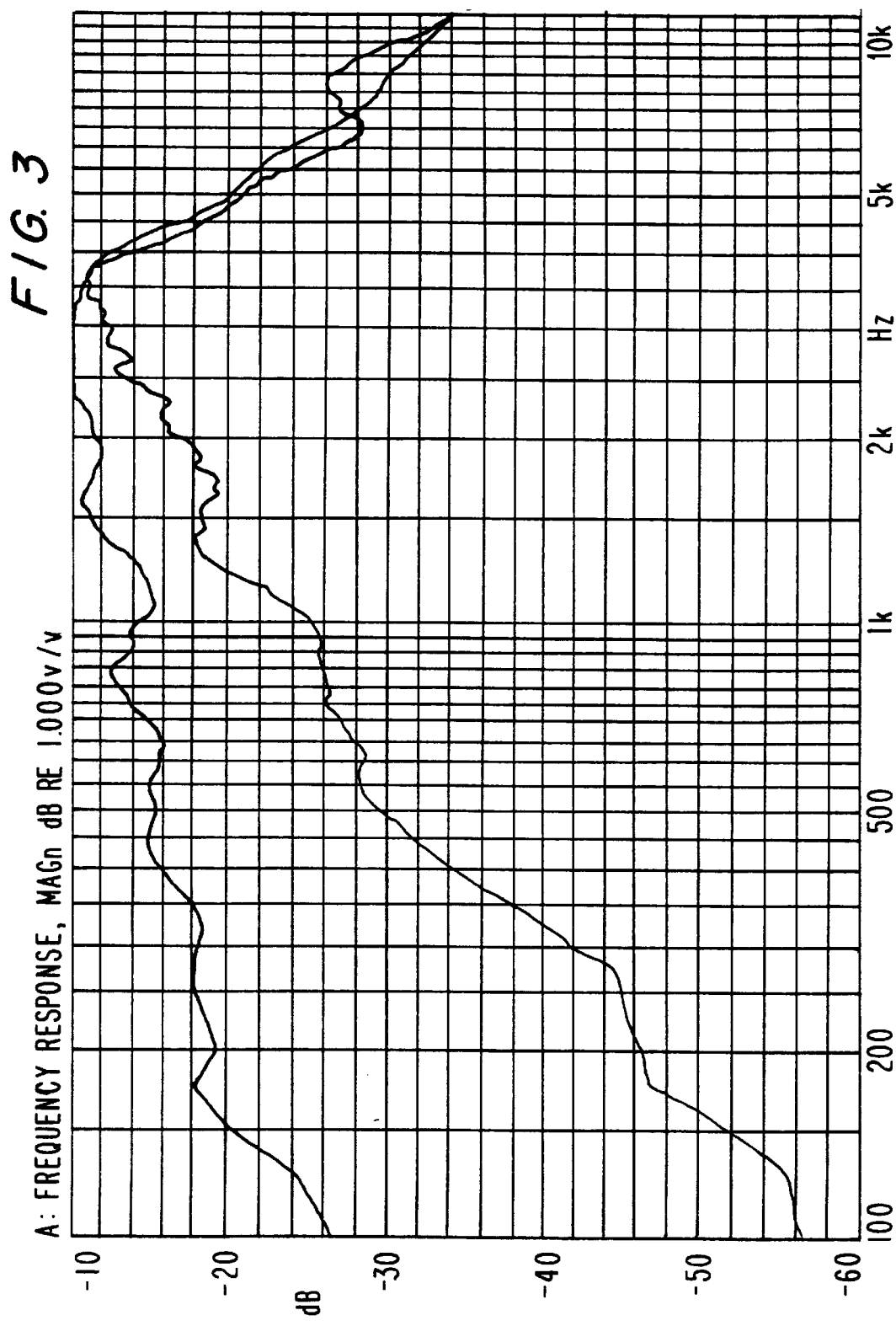
FIG. 3 is an active noise cancellation curve utilizing the noise canceling improvement of the present invention.
Figure 5:
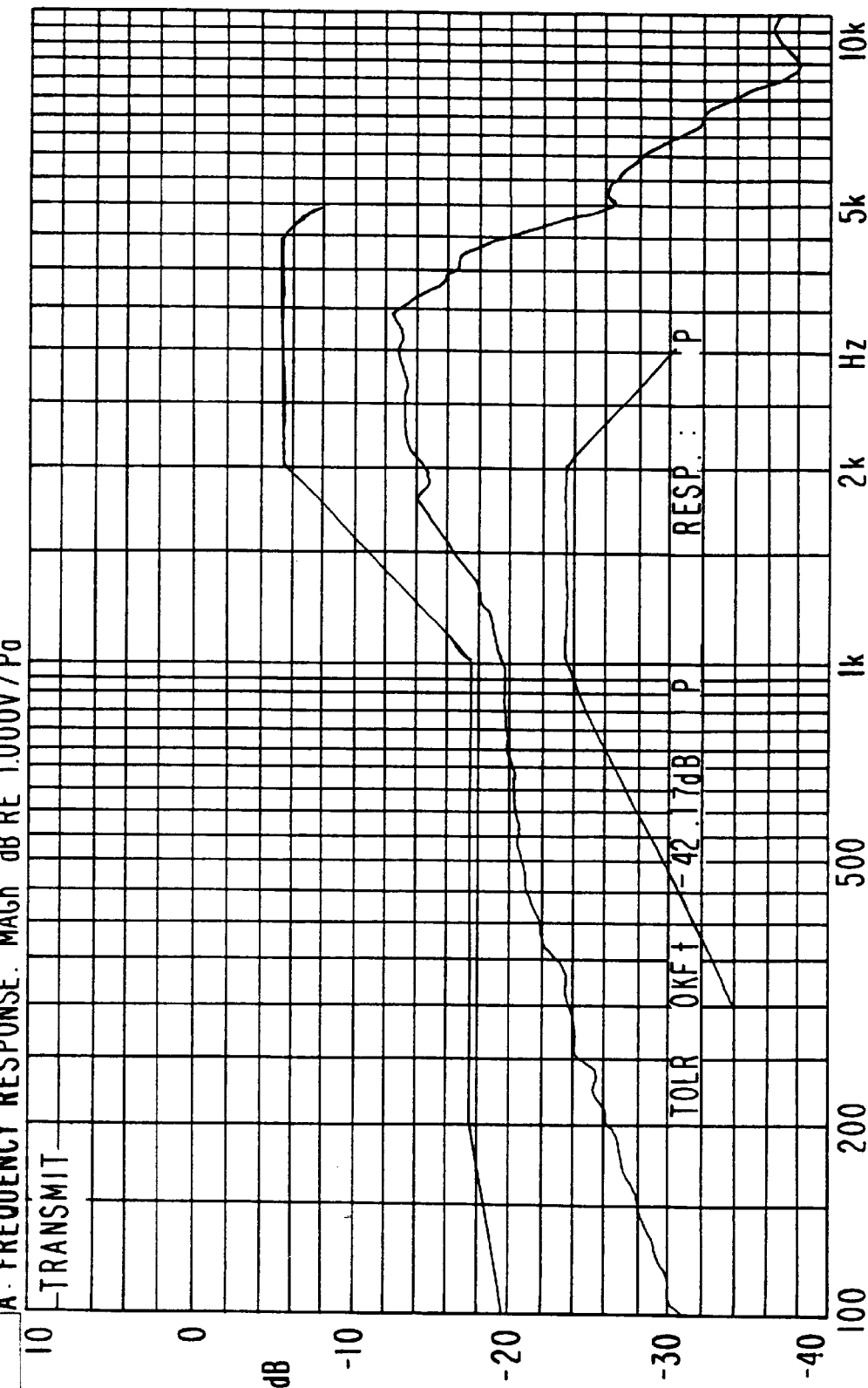
FIG. 5 is a frequency response curve of a noise canceling improvement of the present invention.

To achieve the optimal performance of the noise canceling microphone 12 located in the cellular phone 8, the microphone isolator 9 is milled at the perimeter to a width to achieve the desired noise cancellation curves shown in FIGS. 3 and 5 and the articulation indexes of sound to noise ratio as shown in the data in Tables 1 and 3. The preferred width of the perimeter of the microphone isolator 9 is 1/10th or 0.1 of an inch. The width of the isolator must allow for pressure gradient noise porting or noise flow through from the noise port 10 to reach the pressure gradient microphone surface to cancel out with the noise flow received together with speech from the voice port, which provides for the desired frequency responses shown in FIGS. 3 and 5. The acoustical modification 15 permits pressure gradient noise porting so that the noise is mechanically/acoustically canceled for the audio signal input to the microphone shown in FIGS. 1 and 2.

In addition, the sides of the microphone isolator are sized to a dimension, preferably at a 45 degree angle, to fit properly within the receiver portion of the cellular phone 8 so that optimum microphone coupling is achieved as shown in FIGS. 3 and 5 and the articulation index of sound to noise ratio as set forth in Tables 1 and 3.

A windscreen 14 is comprised of dense foam-like material, preferably 100 ppi plosive windscreen, inserted internally behind the voice port 13 of the cellular phone 8 in FIG. 2. The purpose of the windscreen 13 is to enhance or attenuate the wind noise, spitiness, or other ambient noises that exist when utilizing the cellular phone in a noisy atmosphere or outdoors. The windscreen 14 acts as a structural baffle that may be comprised of a structural member adapted to provide an acoustical separation between the microphone and voice port. Alternatively, an acoustical baffling arrangement could be utilized in place of a structural member. Thus, acoustic distortions are minimized.

The two lead wires (not shown) of the noise canceling microphone 12 were connected to the circuitry contained on the circuit board assembly (not shown) that consist of amplifiers to amplify the electrical signal before being transmitted to speech that reaches the listener's ears. Such circuits enable calibration processing to be performed on the noise canceling microphone, which is preferably a pressure gradient microphone. However, any unidirectional microphone that has a low FET gain and low sensitivity can be utilized in the present invention. Further, such circuits may be included on a printed circuit (pc) board which may be installed within the cellular phone. The circuit board may contain additional circuit elements for processing the signals received from the noise canceling microphone and for amplifying signals for supply to the speaker as described in U.S. patent application Ser. No. 08/339,126 filed Nov. 14, 1994 (PCT No. US95/14756 filed Nov. 14, 1995) and U.S. patent application No. 08/485,047 filed Jun. 7, 1995, both applications which are incorporated herein.

The wires must be oriented and preferably placed so as not to cover or adversely affect the flow of sound conveyed through the voice port 13 and noise port 10 of conventional cellular phones. The lead wires must not interrupt the flow of noise that is received from the ports, which is eventually canceled from the audio signal. The procedure to install at least one noise canceling microphone 12 in a cellular phone requires that the soldering be preferably a non-flux soldering. Non-flux soldering prevents future resin contamination of the noise canceling microphone. Conventional flux based soldering material would interfere with the proper functioning of a noise canceling microphone rendering it inoperative.

Although the above embodiment has been described as having only one microphone 12, which mechanically cancels out the noise from the arrangement of the pressure sensitive surfaces of the noise canceling microphone with regards to the input ports, the invention is not so limited and any number of microphones may be utilized. For example, the digital means of canceling noise by utilizing two or more microphones can also be used provided there is adequate space. The present invention can be utilized with at least two noise canceling microphones in a cellular phone that is in a clamp shell design (similar to the operation of a lap-top computer), or with a NOKIA 9000-GSM phone. The NOKIA phone can be opened for viewing the LCD terminal inside, or to log onto the Internet terminal, to log onto the terminal, for accessing E-mails, and for other multimedia access. When the NOKIA phone is closed, the phone is used for talking, like the Qualcomm QCP-800. Because of the additional external layers, an acoustical baffle or windscreen cannot be utilized to insure noise is canceled by sound equalization. In that embodiment, two noise canceling microphones or electret microphones can be used to digital cancel noise by the acoustical arrangement of the microphones. The utilization of two or more noise canceling microphones is fully described in U.S. patent application Ser. Nos. 08/339,126 (PCT No. US95/14756) and 08/485, 047, which have a common assignee with the present application, and which is hereby incorporated by reference; however, such subject matter is not believed necessary to the understanding of the present invention.

In that alternative embodiment using a NOKIA 9000-GSM, acoustic signals composed of speech or the like and background noise are supplied to a first microphone located on the top layer of the shell design or the portion that flips up vertically, and converted therein into a corresponding electrical signal which is thereafter supplied to the plus terminal of the op-amp. The background noise is supplied to the second microphone located in the bottom layer or stationary portion of the cellular phone and converted therein into a corresponding electrical signal which is thereafter supplied to the minus terminal of the op-amp.

The op-amp is adapted to subtract the noise signal from the second microphone from the speech and noise signal from the first microphone and to supply therefrom an electrical signal representing substantially the speech to the cellular phone 8 whereupon the speech signal is transmitted therefrom through RF waves to the receiving party. The top cover 7 is attached to the cellular phone 8 by use of adhesives or the like or alternatively may be sonically welded together.

In this same alternative embodiment, a receiver portion or the flip portion (not shown) may be configured which includes one or more microphones operating as a first microphone (not shown) and one or more microphones operating as a second microphone (not shown). In this configuration, when using multiple microphones for the first and/or second microphones, respective variable current limiting resistors are preferably provided for all but one microphone for the first microphone and for all microphones for the second microphone.

Thus, the outputs from the first and second microphones, respectively, would comprise a weighted sum of several such microphone output voltages. The current limiting resistors are preferably set to respective values so as to minimize some functional of the difference of the first and second microphones, respectively. The criterion for selecting the values of the current limiting resistor or equivalently the weighing function of each microphone could be selected according to any well known gradient search algorithm, so as to minimize the functional.

As is to be appreciated, by using the above-described devices and materials for acoustically improving the receiver portion of the conventional cellular phones, the cost for constructing such receiver portion is relatively low. Further, the power consumption of the receiver portion is kept relatively low. As a result, the receiver portion may be powered by the standard power available in a battery chargeable cellular phone and, as such, does not require additional power or transformers or the like. Furthermore, although the receiver portion (not shown) has been described for assembly with existing cellular phones, such receiver portion, or a slight variation thereof, may be installed in new cellular phones to be manufactured, like Qualcomm Original QCP-800.

Upon activating the cellular phone 8, e.g., by transmitting the password of the user and entering and sending a telephone number, a signal from the noise canceling microphone 12 is supplied through circuitry, preferably a resistor and a capacitor coupled to an operational amp and then outputted as a resulting signal.

The high frequency signals, such as those over 3.7 kHz, are then removed from the amplified output signal as well as any dc signals that may be present and the resulting signal is supplied to a speaker so as to be converted thereat into an acoustic signal.

By so arranging a noise canceling microphones, a sound (in particular a background noise) originating from two different sources enable the sound to be mechanically as well as acoustically canceled before transferred to the sidetones to the ear of a receiving party. The physical design of the microphone as seen in FIGS. 1 and 2 is the determining factor in the S/N increase. Examination of these drawings shows that the location of the microphone pressure sensitive surface provides the optimum separation of the signal going to the voice microphone and noise ports in the near field. This separation is a primary component in the determination of the signal in the S/N ratio.

Figure 4:
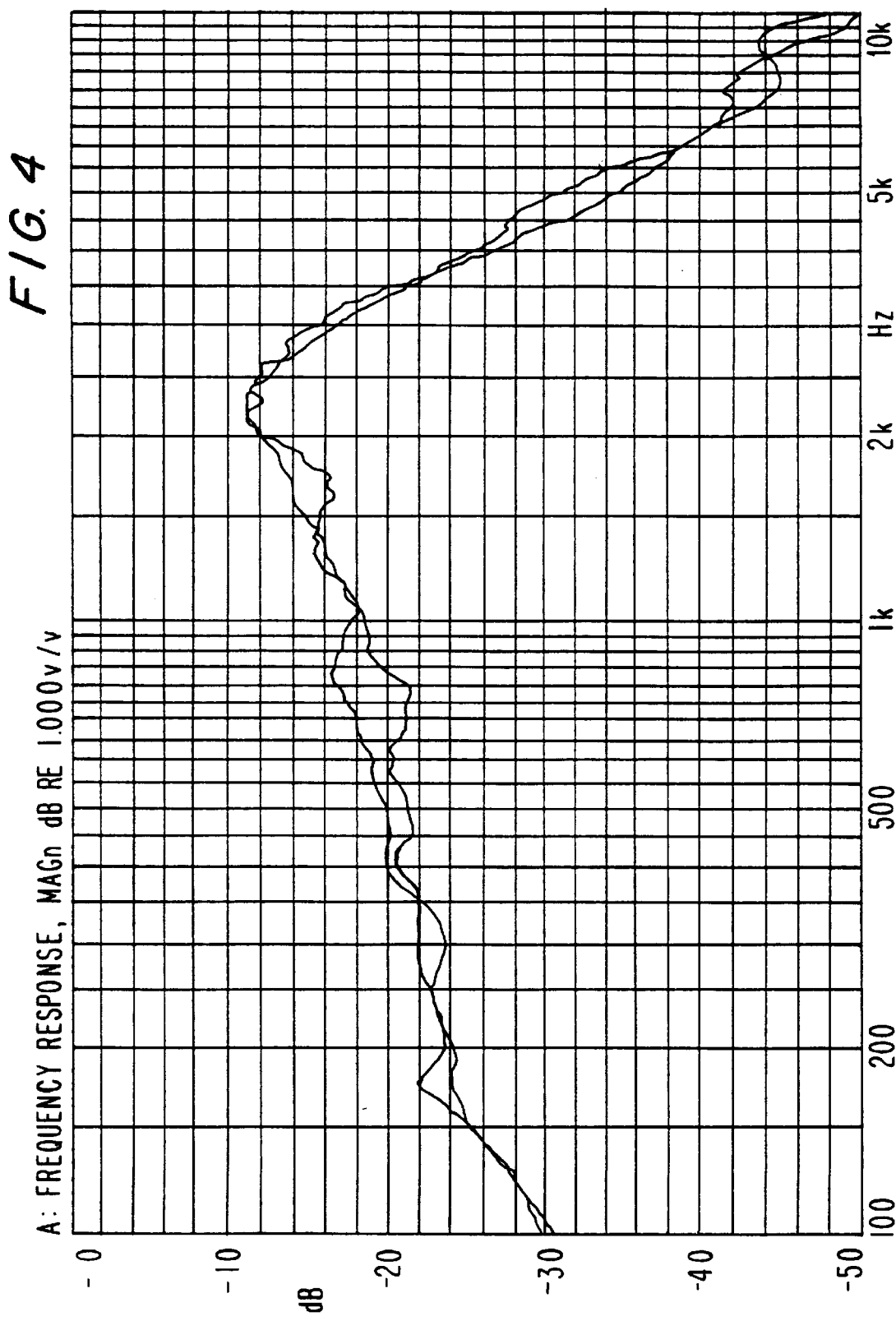
FIG. 4 is an active noise cancellation curve of a prior art cellular phone.

FIGS. 3 and 4 are active noise cancellation curves of with and without the noise canceling acoustical embodiment of the present invention.

FIG. 3, top line, representing near field response and the bottom line, representing far field response conducted at the facilities of Andrea Electronics Corporation. This curve in FIG. 3 with the noise canceling arrangement as shown in FIGS. 1 and 2 shows the noise canceling performance at close speaking range. For instance, at 100 Hz, background noise of almost 30 dB was canceled with the embodiment of the present invention. However, at far speaking range the pressure gradient microphone of the present invention had no real effect in canceling noise. For instance, at 10 kHz, there was only about a 1 dB change with using a noise canceling microphone.

However, in FIG. 4, with is representative of the prior art, the top line representing the near field responses. This curve in FIG. 4 clearly shows almost no differential in utilizing an omnidirectional microphone for noise cancellation in the far and near field response, which has no effect on speech intelligibility.

Figure 6:
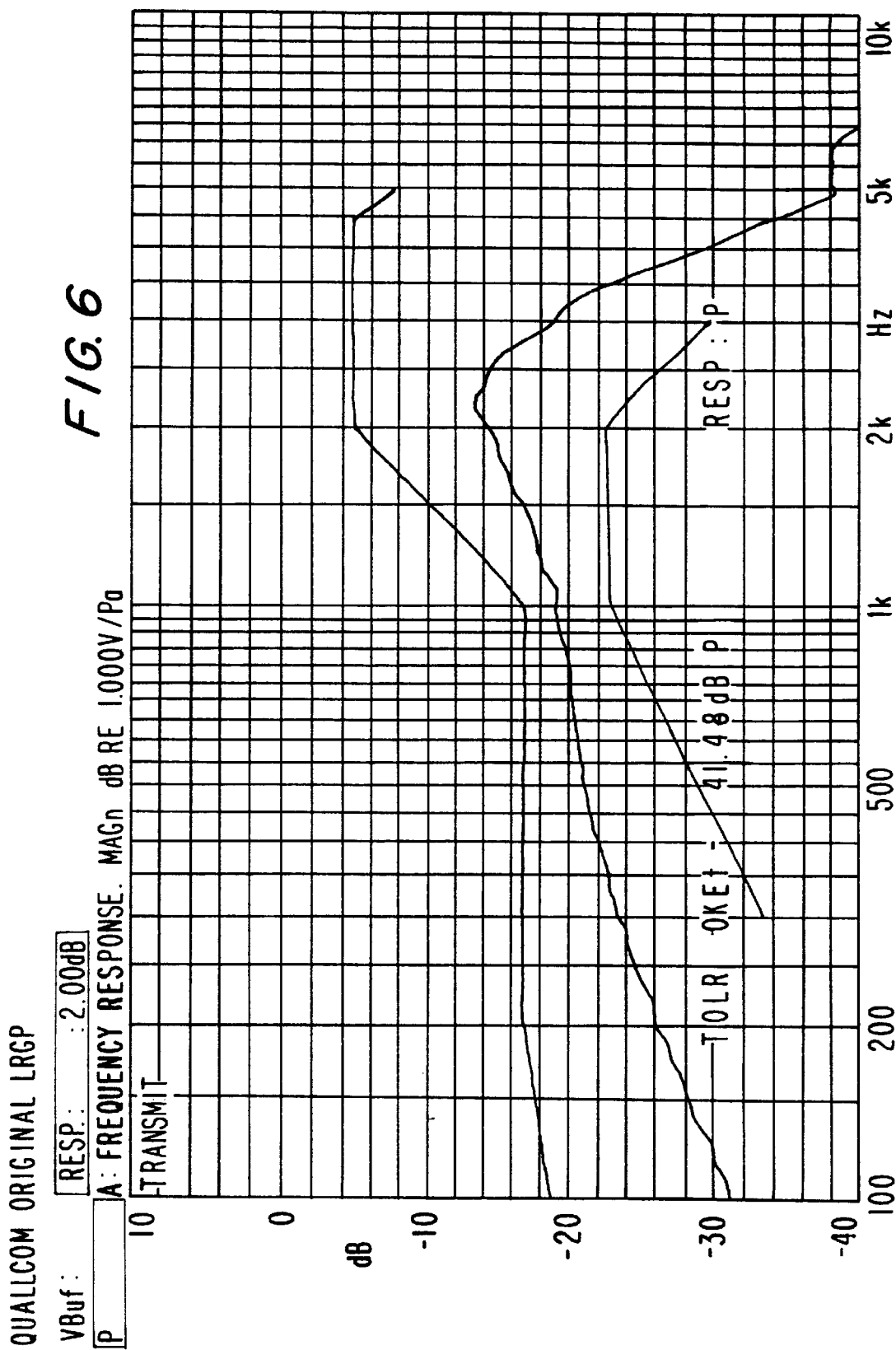
FIG. 6 is a frequency response curve of an omnidirectional microphone of a prior art cellular phone.

In FIGS. 5 and 6, frequency responses curves are represented for the noise canceling microphone and for the standard (prior art) omnidirectional microphone. In FIG. 5, the horizontal axis represents the frequency response of a pressure gradient microphone utilized in a Qualcomm QCP-800 cellular phone over a decibel range represented by the vertical axis conducted at the facilities of Andrea Electronic Corporation. This curve in FIG. 5 when compared to FIG. 6 represents no change in the frequency response of a noise canceling microphone as compared to a non-noise canceling microphone. That is, no sacrifice in frequency response is reported with using a noise canceling microphone having pressure sensitive surfaces. FIG. 6 is representative of the frequency response of a standard microphone utilized in the prior art. The only change appears to be less than a 1 dB at 1 kHz, which trivial change in overall frequency performance.

Using interpretation of speech intelligibility AI and ANSI S3.5-1969, a redesigned Andrea Audio for QCP-800 System of the present invention and a standard (prior art) microphone utilized in a conventional Qualcomm Audio System (QCP-800) were tested and the results were as follows:

TABLE 1

ARTICULATION INDEX:
INVENTIVE BOOM MICROPHONE

| 1/3 Octave Band Center Freq. (Hz) | S/N (Db) [NPR-FPR] | Weight Factor (BW Corrected) | Articulation (1) Weight (W) |
|---|---|---|---|
| 200 | 22 | 0.00046 | 0.01012 |
| 250 | 23 | 0.0012 | 0.0276 |
| 315 | 17 | 0.0012 | 0.0204 |
| 400 | 14 | 0.0016 | 0.0224 |
| 500 | 12 | 0.0016 | 0.0192 |
| 630 | 10 | 0.0023 | 0.023 |
| 800 | 09 | 0.0023 | 0.0207 |
| 1000 | 08 | 0.0028 | 0.0224 |
| 1250 | 07 | 0.0035 | 0.0245 |
| 1600 | 05 | 0.0043 | 0.0215 |
| 2000 | 04 | 0.0044 | 0.0176 |
| 2500 | 03 | 0.0039 | 0.0117 |
| 3150 | 0.5 | 0.0039 | 0.00195 |
|  |  |  | 0.24307 |

TABLE 2

ARTICULATION INDEX:
STANDARD (PRIOR ART) MICROPHONE
(Original Qualcomm Audio System)

| 1/3 Octave Band Center Freq. (Hz) | S/N (Db) [NPR-FPR] | Weight Factor (BW Corrected) | Articulation (1) Weight (W) |
|---|---|---|---|
| 200 | 0 | 0.00046 | 0 |
| 250 | 2 | 0.0012 | 0.0024 |
| 315 | 2 | 0.0012 | 0.0024 |
| 400 | 1 | 0.0016 | 0.0016 |
| 500 | 1 | 0.0016 | 0.0016 |
| 630 | 3 | 0.0023 | 0.0069 |
| 800 | 5 | 0.0023 | 0.0115 |
| 1000 | 1 | 0.0028 | 0.0028 |
| 1250 | 1 | 0.0035 | 0.0035 |
| 1600 | 2 | 0.0043 | 0.0086 |
| 2000 | 0 | 0.0044 | 0 |
| 2500 | 0 | 0.0039 | 0 |
| 3150 | 0 | 0.0039 | 0 |
|  |  |  | 0.0413 |

The following table performs a matching articulation indexes between the present invention and the prior art QuaLcomm cellular phone to determine the overall percentage of syllables, words, or sentences understood correctly by utilizing the acoustical improvement of the present invention in a Qualcomm QCP-800 cellular phone:

| Andrea Electronics | Qualcomm |
| Modified QCP-800 | Original QCP-800 |
| Articulation Index | Articulation Index |
| 0.24307 | 0.0413 |

Matching articulation indexes to corresponding broken line(first presentation to listeners) correlates to 75 words recognized with Andrea modification vs 5 words recognized via Qualcomm original QCP-800 phone

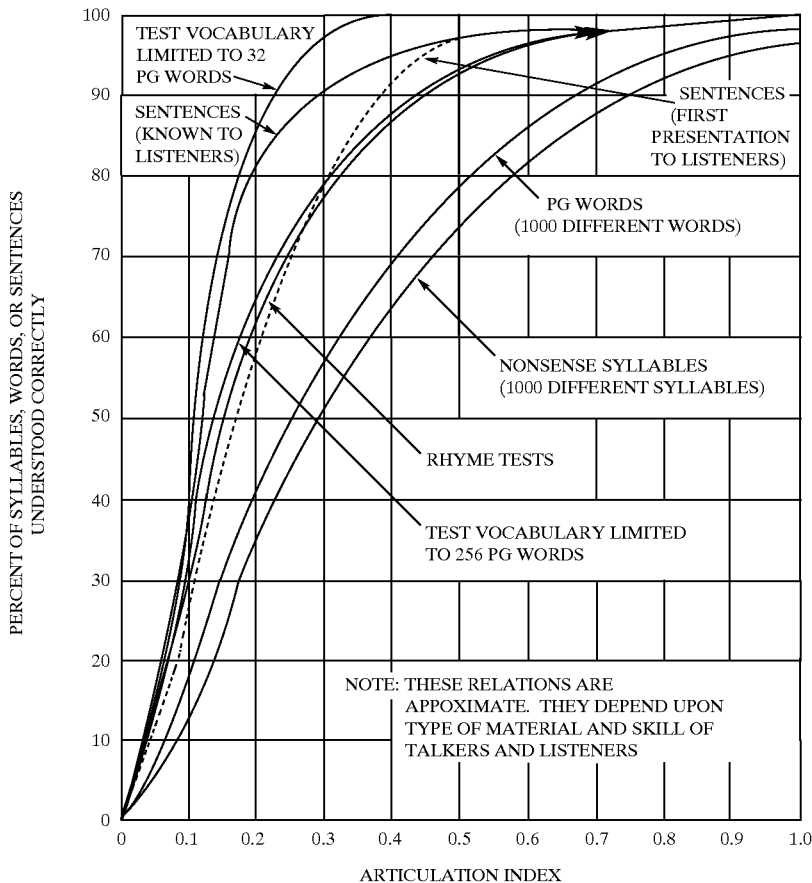

Relation between AI and Various Measures of Speech Intelligibility (References [4] and [8])

Interpretation of speech intelligibility using AI and ANSI S3.5-1969 shows an accuracy level of approximately 70% using a 0.24307 articulation index for the present invention versus an accuracy level of approximately only 15% using a 0.0413 articulation index for the standard omnidirectional microphone in a conventional Qualcomm original QCP-800 cellular phone. A comparison of this data reflects a reduction in error ratio by the present invention (i.e., AI (15%) standard microphone, noise canceling AI (70%) by present invention). Furthermore, additional AI is expected when constants are corrected to be active down to 50 cycles and below. Literal evaluation of the AI calculation states that for every 100 words spoken, the present invention will produce 75 correct words or 25 errors, and prior art standard microphones will produce 5 correct words or commit 95 errors. All data and calculations were collected and performed at Andrea Electronics Corporation. Both microphone systems were tested at Andrea Electronics Corporation under the same conditions.

Figure 7A:
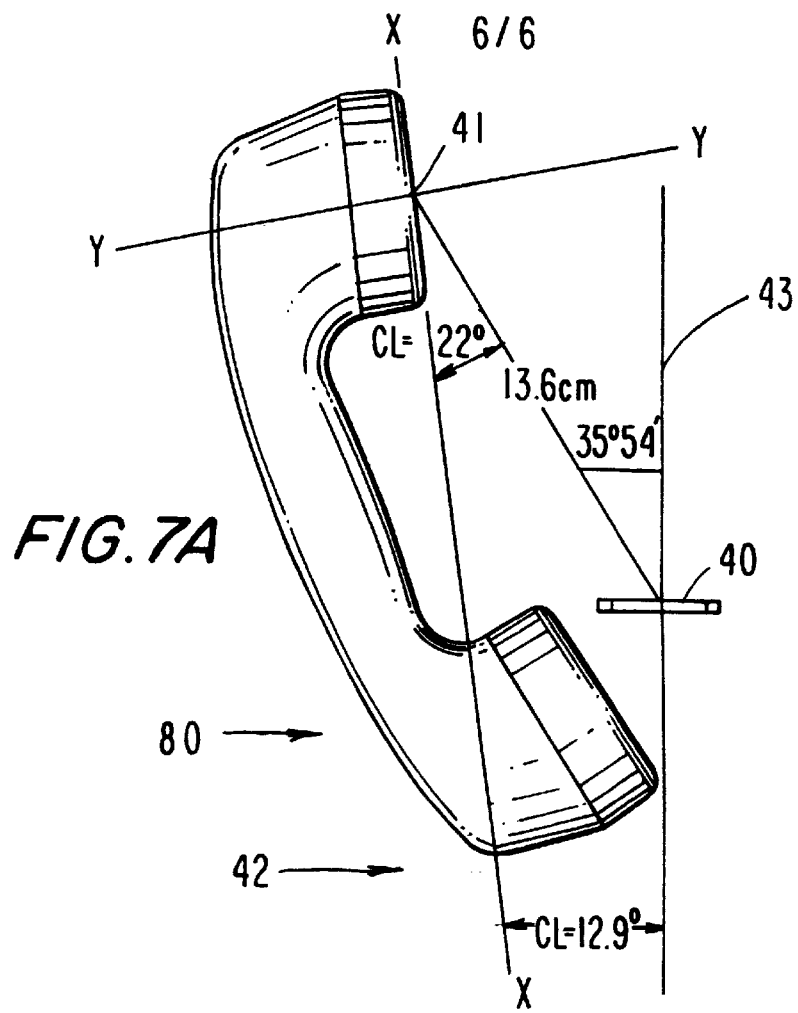
FIGS. 7A, 7B and 7C displays a prior art handset to reveal the loudness rating guard-ring and AEN (STANDARD TOLAR) positions within a standard telephone handset (according to the invention).
Figure 7B:
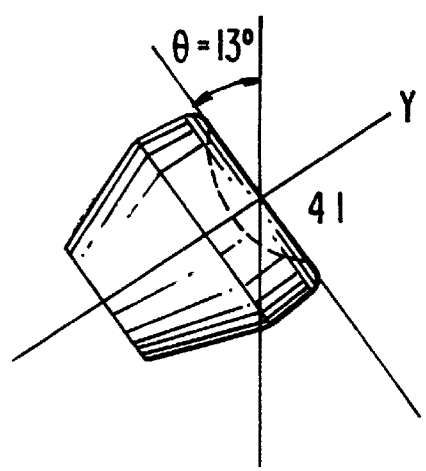
Figure 7C:
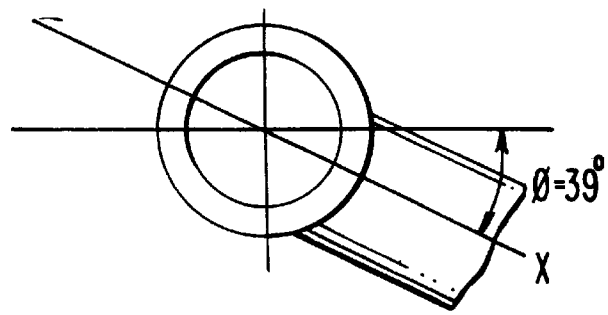

FIGS. 7A, 7B and 7C illustrate the certain positioning of the microphones with regard to an artificial mouth 40 or the loudness rating guard-ring and AEN positions. The tests run at Andrea Electronics Corporation and test results tabulated in Tables 1–3 and in FIGS. 3–6 were conducted at the AEN positions so that TOLAR responses met the conventional standards. The TOLAR responses achieved during the physical testing of the Qualcomm QCP-800 cellular phone met the physical spacing requirements shown in FIGS. 7A–7C. FIG. 7B illustrates the rotation of the handset about the XX axis. FIG. 7C illustrates the rotation of the handset about the YY axis.

In FIG. 7A, where the center line of the X axis intersects with the center line of the Y axis is the centerline of the earpiece or the ear reference point 41. The axis of the artificial mouth is designated by 43, while the plane of the ear cap and ear is 42.

Furthermore, although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. A communications device with a noise canceling acoustical improvement for reducing background noise comprising:

a housing having a receiver portion and a speaker portion; said receiver potion having a voice port and a noise port;

a microphone isolator located within said receiver portion, said microphone isolator being sized for optimum microphone coupling to minimize noise;

at least one noise canceling microphone having a front end and a back end enclosed by said microphone isolator;

a windscreen placed in front of the microphone and internal to said receiver portion behind said voice port;

an acoustical baffle located inside said receiver portion behind said voice port; and an acoustical opening located at the back end of the microphone and internal to said receiver portion behind the noise port, so that ambient noise is mechanically canceled from the noise received with the received speech.

2. The communications device of claim 1, wherein the at least one noise canceling microphone is a pressure gradient microphone.

3. The communications device of claim 1, wherein said windscreen is comprised of an acoustical baffling arrangement incorporated as a structural member of said housing.

* * * * *

UNITED STATES PATENT AND TRADEMARK OFFICE
CERTIFICATE OF CORRECTION

PATENT NO. : 6,108,415
DATED : August 22, 2000
INVENTOR(S) : Douglas Andrea

It is certified that error appears in the above-identified patent and that said Letters Patent is hereby corrected as shown below:

Claims,
Please add the following claims:
-- 4. The communications device of any one of claims 1, 2, or 3 comprising a telephone.
5. The communications device of claim 4 wherein the telephone comprises a wireless telephone.
6. The communications device of claim 4 wherein the telephone comprises a cellular telephone. --

Signed and Sealed this

Thirteenth Day of November, 2001

Attest:

*Nicholas P. Godici*

NICHOLAS P. GODICI
*Attesting Officer*    *Acting Director of the United States Patent and Trademark Office*